United States Patent Office 3,538,179
Patented Nov. 3, 1970

3,538,179
PURIFICATION OF ISOPRENE
William T. Nelson, Bartlesville, Okla., assignor to Phillips
 Petroleum Company, a corporation of Delaware
No Drawing. Filed Nov. 20, 1968, Ser. No. 777,475
Int. Cl. *C07c 7/00, 23/00; C09g 29/06*
U.S. Cl. 260—681.5                                    4 Claims

ABSTRACT OF THE DISCLOSURE

Purification of isoprene to remove cyclopentadiene with metal hypochlorites.

---

This invention relates to the purification of hydrocarbons and more particularly to the purification of isoprene.

The presence of cyclopentadiene with isoprene has a significant detrimental effect on the polymerization of isoprene. The presence of cyclopentadiene with isoprene can reduce polymerization conversion of isoprene as much as 25% or more. It is thus apparent that isoprene and particularly isoprene which is to be used for polymerization should contain an extremely small amount of cyclopentadiene. This invention provides a method for purifying isoprene, that is, removing therefrom cyclopentadiene.

In accordance with this invention isoprene contaminated with cyclopentadiene is contacted with a metal hypochlorite, preferably an alkali or alkaline earth metal hypochlorite, which selectively reacts with cyclopentadiene permitting the purified isoprene to be readily separated.

According to a preferred embodiment of the invention, an isoprene-containing stream is contacted with an aqueous alkaline solution of a metal hypochloride such as sodium hypochlorite, lithium hypochlorite, calcium hypochlorite and the like. The concentration of the metal hypochlorite in the treating solution is preferably maintained within the range of about 3 to 10% by weight. It is also preferred that the hypochlorite treating solution be definitely alkaline and to this end an alkali such as sodium hydroxide, potassium hydroxide, lithium hydroxide and the like can be incorporated therein say, for example, in amounts up to 10% by weight. Use of a small amount of a surface active agent, say, for example, up to 0.5% by weight of the treating solution, is advantageous. Any chlorine-stable surface active agent can be employed.

The impure isoprene is contacted with the hypochlorite at a temperature of from about 30 to 300° F., preferably at a temperature of from 50 to 200° F. The volume of the hypochlorite purifying agent employed generally ranges from about 0.1 to 10 times the volume of isoprene being treated. The purification treatment is preferably carried out under pressure sufficient to maintain the $C_5$ hydrocarbons in liquid phase, although the purification treatment can be conducted in vapor phase.

Other hydrocarbons in addition to the cyclopentadiene can be present with the isoprene undergoing treatment but the purifying action of the hypochlorites are quite specific with respect to cyclopentadiene. Thus, for example, a mixture of isoprene with hydrocarbons such as pentane, pentenes, butenes, acetylenes, piperylene and the like can be treated for removal of cyclopentadiene in accordance with this invention.

Treatment of the isoprene with the hypochlorites can be conducted in a batch or continuous manner using any suitable apparatus which provides intimate contact of the hypochlorite treating agent with the impure isoprene. Thus, the treatment can be conducted in a stirred reactor equipped with a high shear impeller or in a tubular reactor which utilizes turbulent flow to achieve intimate contact. While removal of cyclopentadiene by means of the hypochlorite involves a chemical reaction, the purification treatment can be carried out in the manner of liquid-liquid extraction or extractive distillation. The treating time depends to considerable extent upon the efficiency of contact between the impure isoprene and hypochlorite treating agent. With efficient contact and use of higher treating temperatures the purification is accomplished more rapidly. Generally, the purification is achieved in a period from about several minutes to several hours. Separation of the purified isoprene can be accomplished in any convenient manner such as by distillation, extractive distillation, chromatography and the like.

The ability of metal hyprochlorites to selectively remove cyclopentadiene when present in mixtures with isoprene is apparent from the following examples.

EXAMPLE I 1.3 grams of an isoprene-containing feed as shown below was treated with 4.1 grams of an aqueous sodium hypochlorite solution containing 0.1 gram excess sodium hydroxide. The treatment was carried out at a temperature of approximately 25° C. by intermittently shaking the reaction vessel. The results of the treatment as determined by gas-liquid chromatography at various times were as follows:

|  | Feed | After 50 minutes | After 2 hours |
|---|---|---|---|
| Isoprene | 90.66 | 91.19 | 91.60 |
| Trans-piperylene | 4.44 | 4.44 | 4.44 |
| Cis-piperylene | 3.91 | 3.89 | 3.91 |
| Cyclopentadiene | 0.99 | 0.48 | 0.05 |

EXAMPLE II

In this example, a diene concentrate was shaken with 1.78 times its weight of a 6 percent commercial metal hypochlorite, "Purex," containing 2.4 percent excess sodium hydroxide. The diene concentrate and the treated hydrocarbon analyzed as follows:

| | Composition, percent by weight | | | |
|---|---|---|---|---|
| | Diene concentrate | After 50 minutes | After 120 minutes | After 195 minutes |
| Isoprene | 90.65 | 91.19 | 91.60 | 91.75 |
| Piperylenes | 8.35 | 8.33 | 8.35 | 8.22 |
| Cyclopentadiene | 1.00 | 0.48 | 0.050 | 0.030 |

EXAMPLE III

In this example a synthetic feed containing n-pentane as a component was contacted with 2.47 times its weight of alkaline hypochlorite. The feed and effluent analyses indicate that there was no loss of isoprene.

| | Synthetic feed, percent by weight | After 150 minutes, percent by weight |
|---|---|---|
| n-Pentane | 10.61 | 10.74 |
| Isoprene | 88.21 | 89.23 |
| Cyclopentadiene | 1.18 | 0.027 |

Similar results are achieved using other metal hypochlorites such as lithium hypochlorite and calcium hypochlorite. Moreover, the time of treatment is reduced by carrying out the purification treatment in such manner as to achieve intimate contact between the isoprene undergoing treatment and the hypochlorite treating agent. This is shown in the following example wherein the treatment was effected in a Waring Blendor.

EXAMPLE IV

In this example the weight ratio of alkaline hypochlorite to hydrocarbon feed was 1.40.

|  | Composition, percent by weight | | | |
|---|---|---|---|---|
|  | Feed | After 11 minutes | After 21 minutes | After 31 minutes |
| n-Pentane | 10.61 | 10.34 | 10.27 | 9.36 |
| Isoprene | 88.21 | 89.06 | 89.57 | 90.61 |
| Cyclopentadiene | 1.18 | 0.60 | 0.155 | 0.030 |

It was found also that by adding 0.38 percent of a surfactant, "Scotchban," to the hydrocarbon phase, the cyclopentadiene could be reduced from 1.00 percent to 15 parts per million after 30 minutes contact time in the Waring Blendor. The Waring Blendor was operated at 13,000 revolutions per minute and it heated the reactants to temperatures estimated at 180–200° F.

Those modifications and equivalents which fall within the spirit of the invention are to be considered a part thereof.

I claim:

1. A process for removing cyclopentadiene from isoprene contaminated therewith which comprises contacting the mixture of isoprene and cyclopentadiene with an aqueous solution of a metal hypochlorite, and then separating isoprene from said mixture.

2. A process in accordance with claim 1, wherein contacting of the isoprene and cyclopentadiene is carried out in the liquid phase.

3. A process in accordance with claim 1, wherein the metal hypochlorite is in an aqueous alkaline solution.

4. A process in accordance with claim 3, wherein the aqueous alkaline solution of metal hypochlorite contains a small amount of a chlorine-stable surface active agent.

References Cited

UNITED STATES PATENTS

| 2,564,914 | 8/1951 | Murray | 260—677 |
| 2,631,171 | 3/1953 | Newcomer | 260—648 |
| 2,658,085 | 11/1953 | Kleiman | 260—648 |
| 2,752,297 | 6/1956 | Kleiman | 203—28 |
| 2,900,420 | 8/1959 | Lidov | 260—648 |
| 2,904,599 | 9/1959 | Kleiman et al. | 260—648 |

FOREIGN PATENTS

| 858,769 | 1/1961 | Great Britain. |

OTHER REFERENCES

Straus et al.: "On the Substitution of Positive Hydrogen by Chlorine," Berichte 63, pp. 1868–1899 (1930).

DELBERT E. GANTZ, Primary Examiner

G. E. SCHMITKONS, Assistant Examiner

U.S. Cl. X.R.

208—259, 280, 284, 286, 298; 260—648